United States Patent
Zhu

(10) Patent No.: US 8,051,305 B2
(45) Date of Patent: Nov. 1, 2011

(54) MOTHERBOARD DEVICE AND COMPUTING APPARATUS CAPABLE OF SELECTIVELY CONTROLLING ELECTRIC POWER SUPPLIED TO ONE OF TWO GRAPHICS CARDS

(75) Inventor: Wen-Jie Zhu, Kunshan (CN)

(73) Assignees: Micro-Star International Co., Ltd., Jung-He, Taipei Hsien (TW); MSI Electronic (Kun Shan) Co., Ltd., Kunshan, Chiangsu (CN)

( * ) Notice: Subject to any disclaimer, the term of this patent is extended or adjusted under 35 U.S.C. 154(b) by 746 days.

(21) Appl. No.: 12/155,441

(22) Filed: Jun. 4, 2008

(65) Prior Publication Data

US 2009/0164687 A1    Jun. 25, 2009

(30) Foreign Application Priority Data

Dec. 19, 2007  (TW) ............................... 96148649 A

(51) Int. Cl.
G06F 1/00 (2006.01)
G06F 15/00 (2006.01)
G06F 15/76 (2006.01)

(52) U.S. Cl. ............ 713/300; 713/320; 345/501; 712/2; 712/10; 712/25; 712/28

(58) Field of Classification Search .................. 713/300, 713/320; 345/501; 712/2, 10, 25, 28
See application file for complete search history.

(56) References Cited

U.S. PATENT DOCUMENTS

| | | | | |
|---|---|---|---|---|
| 7,594,061 B2 * | 9/2009 | Shen et al. | ..................... | 710/317 |
| 7,721,118 B1 * | 5/2010 | Tamasi et al. | ................. | 713/300 |
| 7,812,835 B2 * | 10/2010 | Kwak | ........................... | 345/211 |
| 2008/0030509 A1 * | 2/2008 | Conroy et al. | ................ | 345/502 |
| 2008/0117222 A1 * | 5/2008 | Leroy et al. | .................... | 345/522 |

* cited by examiner

*Primary Examiner* — Stefan Stoynov
(74) *Attorney, Agent, or Firm* — Thomas, Kayden, Horstemeyer & Risley, LLP

(57) ABSTRACT

A motherboard device includes a first connecting interface coupled to a first graphics card, a second connecting interface coupled to a second graphics card, a power source connected electrically to the first connecting interface for supplying electric power to the first graphics card via the first connecting interface, and a switch unit interconnecting electrically the power source and the second connecting interface, and operable so as to switch between an ON-state, where the power source supplies electric power to the second graphics card via the second connecting interface, and an OFF-state, where the electric power from the power source is not supplied to the second graphics card.

8 Claims, 5 Drawing Sheets

MOTHERBOARD DEVICE AND COMPUTING APPARATUS CAPABLE OF SELECTIVELY CONTROLLING ELECTRIC POWER SUPPLIED TO ONE OF TWO GRAPHICS CARDS

CROSS-REFERENCE TO RELATED APPLICATION

This application claims priority of Taiwanese Application No. 096148649, filed on Dec. 19, 2007.

BACKGROUND OF THE INVENTION

1. Field of the Invention

The invention relates to a motherboard device and computing apparatus, more particularly to a motherboard device and computing apparatus mounted with two graphics cards.

2. Description of the Related Art

Currently, in a conventional computing apparatus having a multi-GPU processing unit, which is compatible with a Scalable Link Interface (SLI) standard proposed by nVIDIA Corporation, when the multi-GPU processing unit is operated in a two-card processing mode, the multi-GPU processing unit supplies data to two graphics cards via two PCI-Express slots, respectively, in order to increase an operating speed during image processing, such as 3D image processing, thereby resulting in an increased power consumption as compared to that by a single graphics card.

During text processing, while the multi-GPU processing unit is required to operate in the two-card processing mode, electric power is still supplied to each of the two graphics cards, thereby resulting in waste of power.

SUMMARY OF THE INVENTION

Therefore, the object of the present invention is to provide a motherboard device and computing apparatus that are capable of selectively controlling electric power to one of two graphics cards.

According to one aspect of the present invention, a motherboard device comprises:

a first connecting interface adapted to be coupled to a first graphics card;

a second connecting interface adapted to be coupled to a second graphics card;

a power source connected electrically to the first connecting interface and adapted for supplying electric power to the first graphics card via the first connecting interface; and a switch unit interconnecting electrically the power source and the second connecting interface, and operable so as to switch between an ON-state, where the power source supplies electric power to the second graphics card via the second connecting interface, and an OFF-state, where the electric power from the power source is not supplied to the second graphics card.

According to another aspect of the present invention, a computing apparatus comprises:

first and second connecting interfaces;

first and second graphics cards coupled respectively to the first and second connecting interfaces;

a power source connected electrically to the first connecting interface for supplying electric power to the first graphics card via the first connecting interface; and a switch unit coupled between the second connecting interface and the power source, and operable so as to switch between an ON-state, where the power source supplies electric power to the second graphics card via the second connecting interface, and an OFF-state, where the electric power from the power source is not supplied to the second graphics card.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
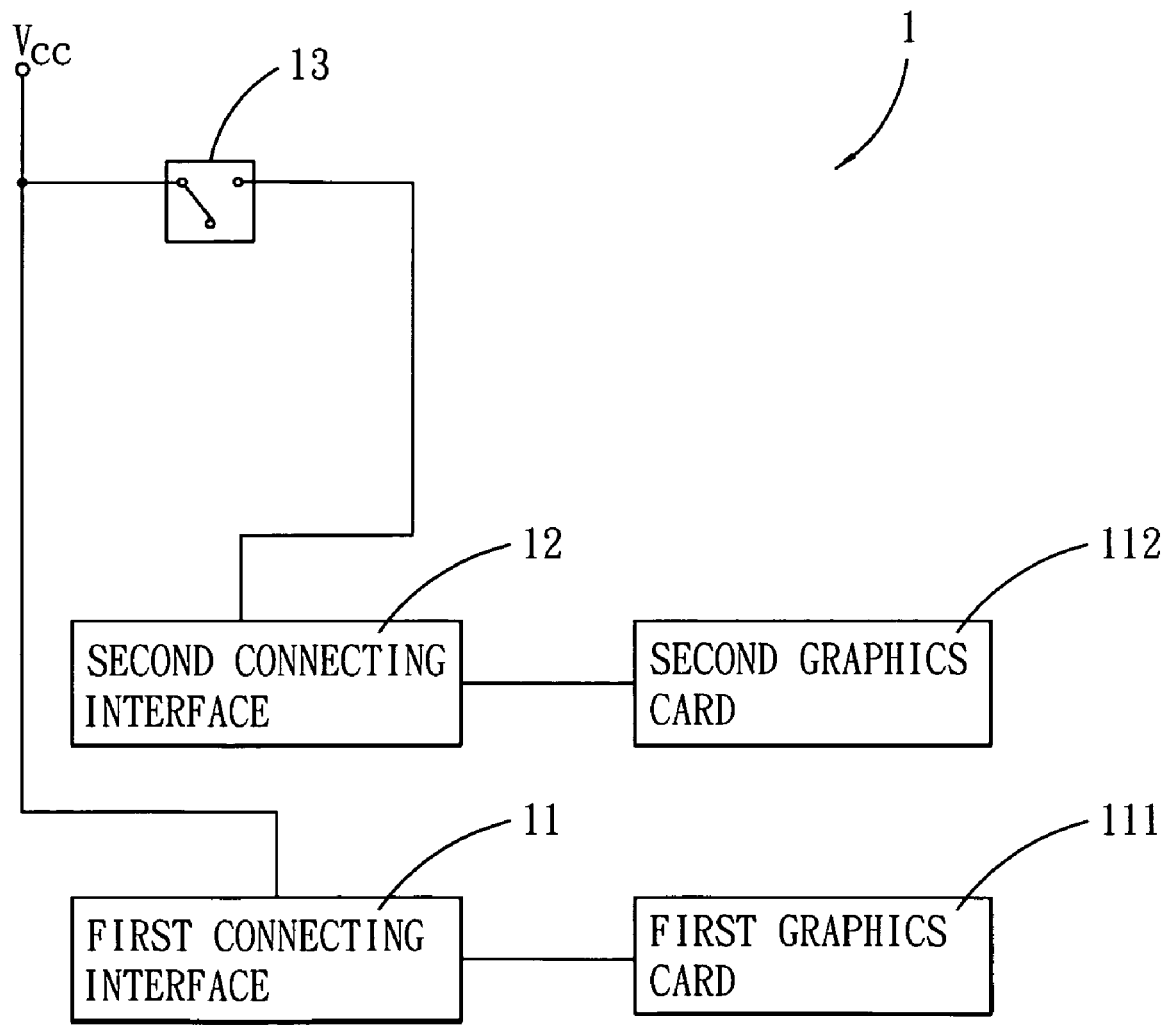
FIG. 1 is a schematic circuit block diagram illustrating the first preferred embodiment of a computing apparatus according to the present invention.

Before the present invention is described in greater detail, it should be noted that like elements are denoted by the same reference numerals throughout the disclosure.

Referring to FIG. 1, the first preferred embodiment of a computing apparatus 1 according to the present invention is shown to include first and second connecting interfaces 11, 12, first and second graphics cards 111, 112, a power source (Vcc), and a switch unit 13. It is noted that the power source (Vcc), the first and second connecting interfaces 11, 12 and the switch unit 13 can be embodied in a motherboard device.

In this embodiment, each of the first and second connecting interfaces 11, 12 is a PCI-Express interface but should not be limited thereto.

The first and second graphics cards 111, 112 are coupled respectively to the first and second connecting interfaces 11, 12.

The power source (Vcc) is connected electrically to the first connecting interface 11 for supplying electric power to the first graphics card 111 via the first connecting interface 11.

The switch unit 13 interconnects electrically the power source (Vcc) and the second connecting interface 12, and is operable so as to switch between an ON-state, where the power source (Vcc) supplies electric power to the second graphics card 112 via the second connecting interface 12, and an OFF-state, where the electric power from the power source (Vcc) is not supplied to the second graphics card 112. In this embodiment, the switch unit 13 includes a manually operated mechanical switch.

Figure 2:
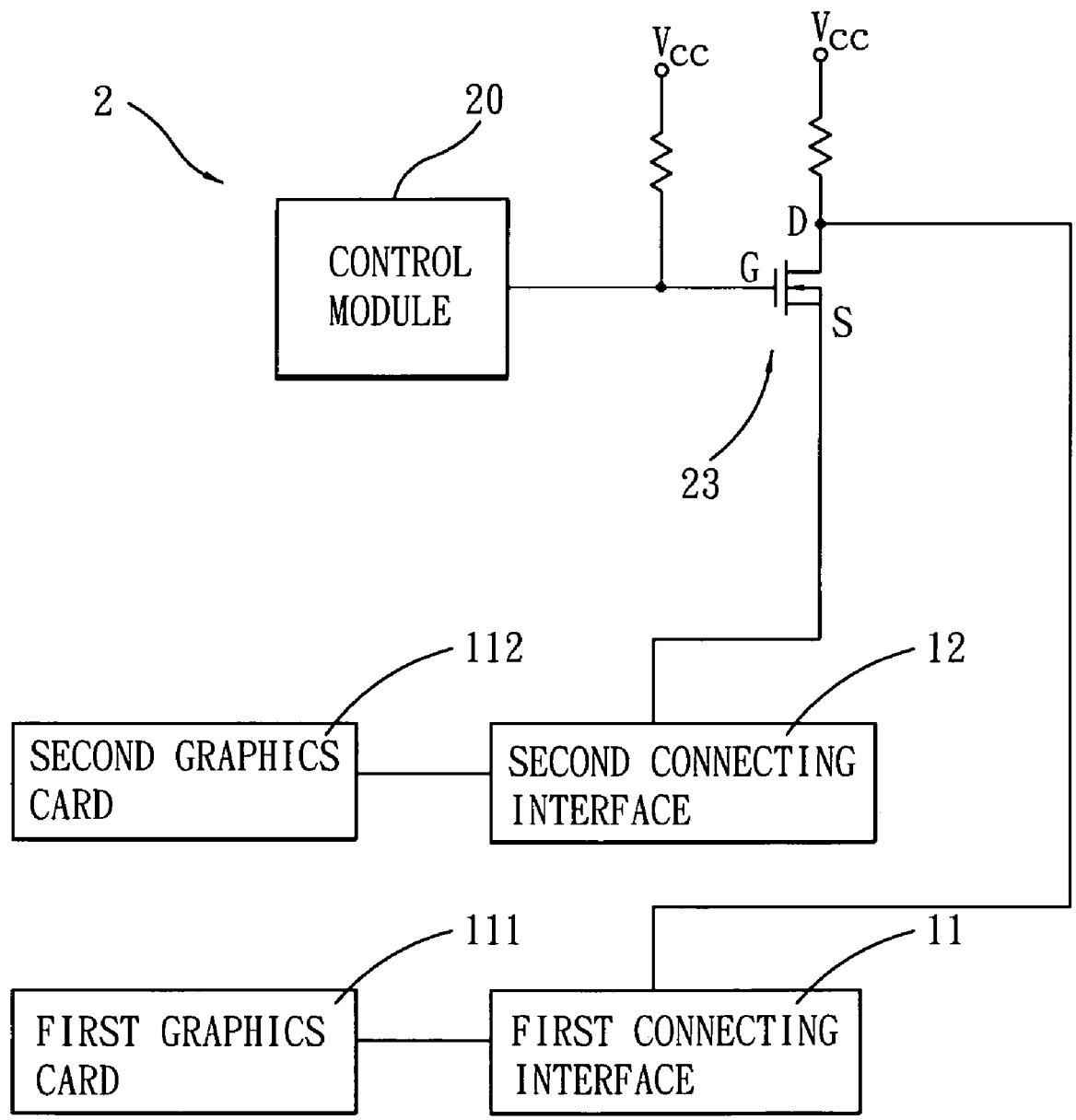
FIG. 2 is a schematic electrical circuit block diagram illustrating the second preferred embodiment of a computing apparatus according to the present invention.

FIG. 2 illustrates the second preferred embodiment of a computing apparatus 2 according to this invention, which is a modification of the first preferred embodiment. In this embodiment, the computing apparatus 2 further includes a control module 20 that is coupled to the switch unit 23, and that is operable so as to output a control signal to the switch unit 23 so that the switch unit 23 is switched to a selected one of the ON-state and the OFF-state based on the control signal from the control module 20. In addition, the switch unit 23 includes an n-channel MOSFET that has a source (S) coupled to the second connecting interface 12, a gate (G) coupled to the control module 20, and a drain (D) connected electrically to the power source (Vcc) via a resistor. When the control signal outputted from the control module 20 is a first-level voltage, the switch unit 23 is switched to the ON-state. When the control signal outputted from the control module 20 is a second-level voltage different from the first-level voltage, the switch unit 23 is switched to the OFF-state. Here, the first-level voltage is a high-level voltage, whereas the second-level voltage is a low-level voltage.

Figure 3:
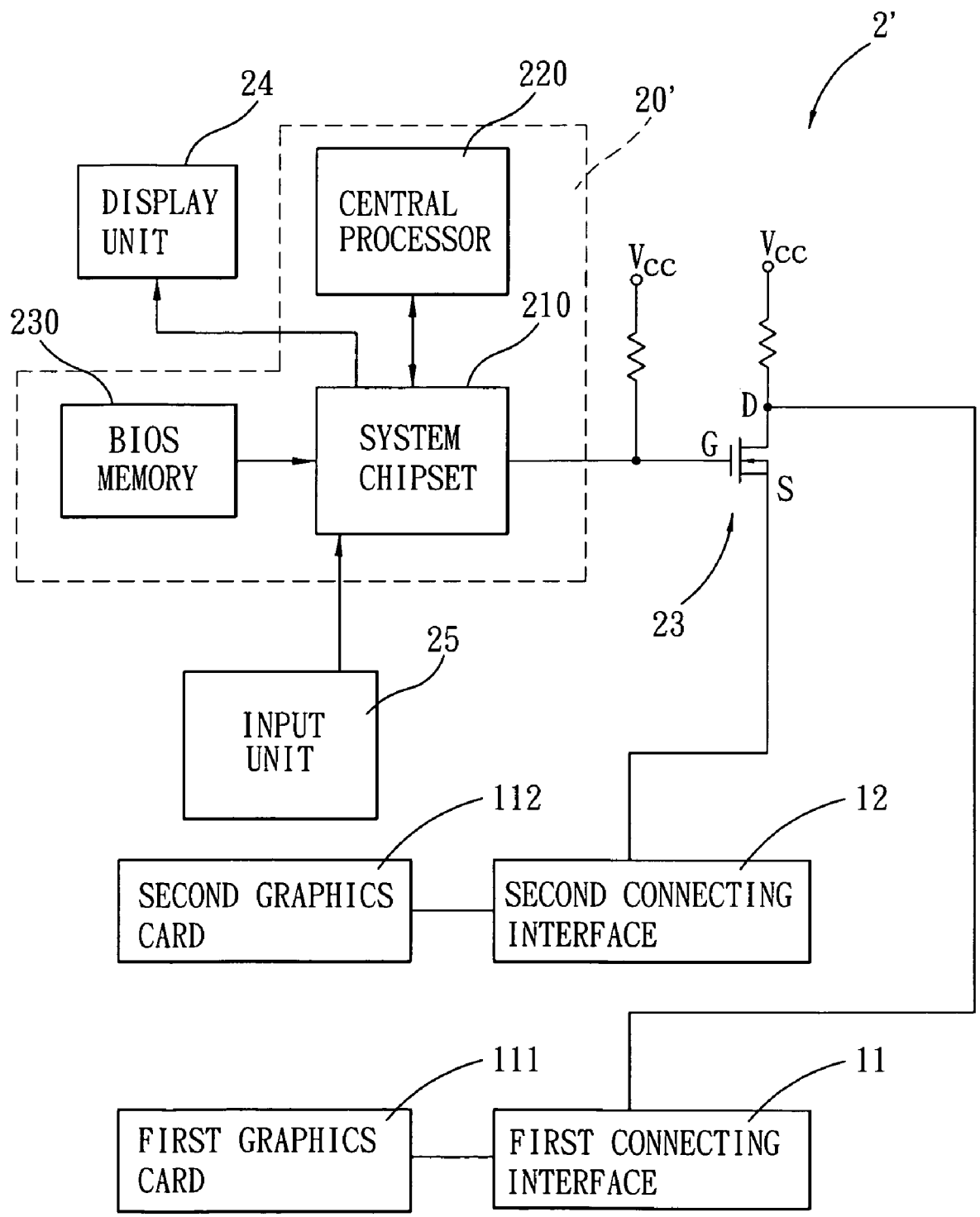
FIG. 3 is a schematic electrical circuit block diagram illustrating the third preferred embodiment of a computing apparatus according to the present invention.

FIG. 3 illustrates the third preferred embodiment of a computing apparatus 2' according to this invention, which is a modification of the second preferred embodiment. Unlike the second preferred embodiment, the control module 20' includes a BIOS memory 230, a system chipset 210, and a central processor 220. The BIOS memory 230 stores BIOS data and program code data for initialization. The system chipset 210 is coupled to the BIOS memory 230 and the gate (G) of the n-channel MOSFET of the switch unit 23, and includes North-bridge and South-bridge chipsets (not shown). The central processor 220 is coupled to the system chipset 210. Since the system chipset 210 and the central processor 220 are conventional, the detailed descriptions thereof are omitted herein for the sake of brevity. In this embodiment, the system chipset 210 has a control pin, such as GPIO, for outputting the control signal.

In addition, the computing apparatus 2' further includes a display unit 24 coupled to the system chipset 210 of the control module 20', and an input unit 25, such as a keyboard, coupled to the system chipset 210 of the control module 20'.

The central processor 220 reads the BIOS data and the program code data from the BIOS memory 230 for initialization upon power-on of the computing apparatus 2' so that the system chipset 210 is able to generate an output corresponding to the program code data, indicative of a currently set one of the ON-state and the OFF-state of the switch unit 23, and displayed on the display unit 24.

The input unit 25 is operable in accordance with the output displayed on the display unit 24 to output an input signal corresponding to the selected one of the ON-state and the OFF-state of the switch unit 23 to the system chipset 210 so that the system chipset 210 updates the program code data based on the input signal from the input unit 25 and outputs the control signal to the switch unit 23 based on the program code data.

Figure 4:
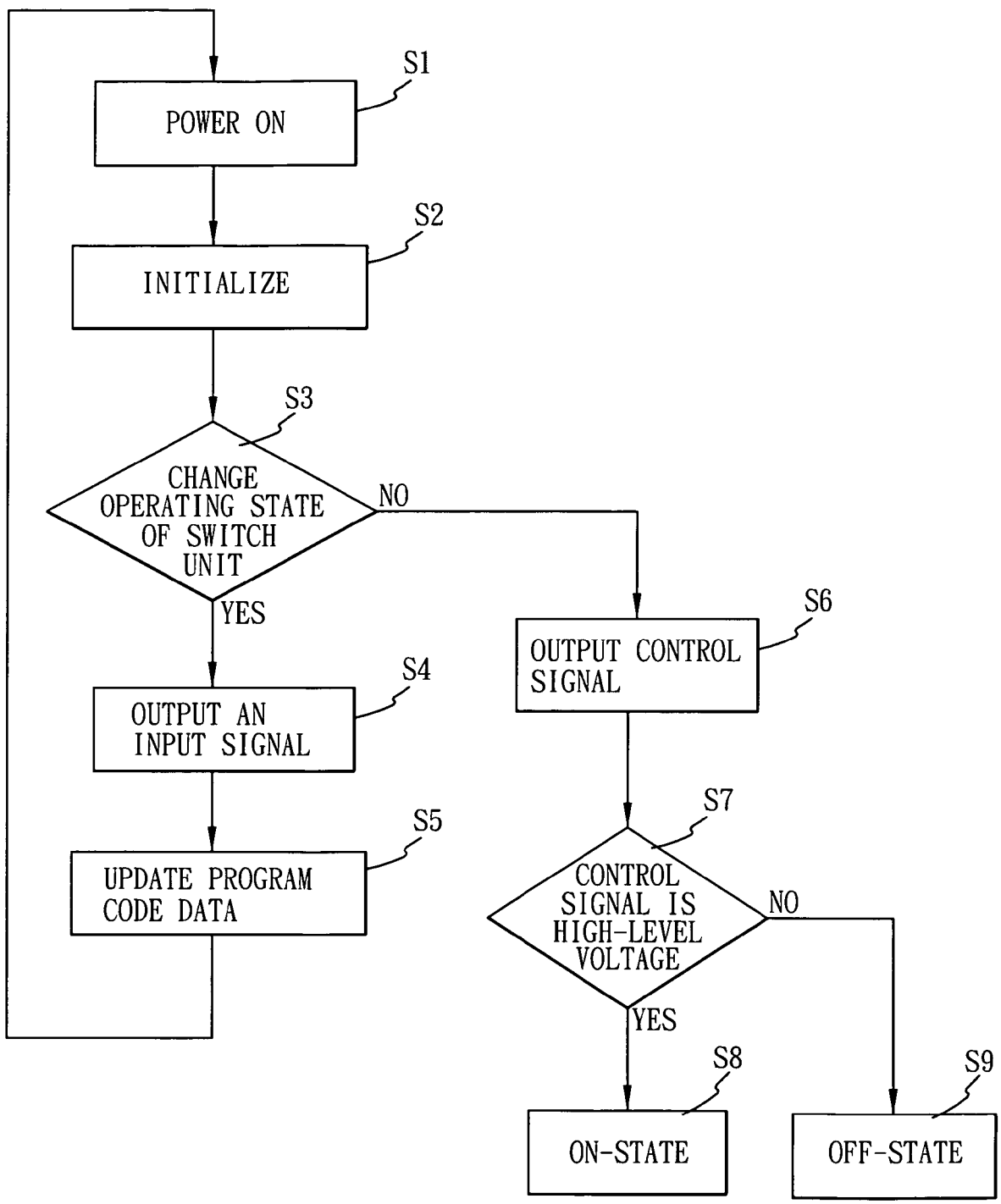
FIG. 4 is a flow chart illustrating how the third preferred embodiment controls electric power supplied to a second graphics card.

Referring to FIG. 4, there is shown a flow chart to illustrate how the computing apparatus 2' controls electric power supplied to the second graphics card 112.

In step S1, the computing apparatus 2' is powered on.

In step S2, the central processor 220 reads the BIOS data and the program code data from the BIOS memory 230 for initialization so that the system chipset 210 is able to generate the output corresponding to the program code data, indicative of the currently set one of the ON-state and the OFF-state of the switch unit 23, and displayed on the display unit 24 in the form of a setup menu.

In step S3, it is determined whether the currently set one of the ON-state and the OFF-state is to be changed. If affirmative, the flow goes to step S4. Otherwise, i.e., the currently set one of the ON-state and the OFF-state of the switch unit 23 is the selected one of the ON-state and the OFF-state of the switch unit 23, the flow proceeds to step S6.

In step S4, the input unit 25 is operable to output an input signal corresponding to the selected one of the ON-state and the OFF-state of the switch unit 23 to the system chipset 210.

In step S5, the system chipset 210 updates the program code data based on the input signal from the input unit 25. Thereafter, the flow goes back to step S1.

In step S6, the system chipset 210 outputs the control signal to the switch unit 23 based on the program code data.

In step S7, it is determined whether the control signal from the system chipset 210 is a high-level voltage. If affirmative, the flow goes to step S8. Otherwise, the flow proceeds to step S9.

In step S8, the switch unit 23 is operated in the ON-state so that the electric power from the power source (Vcc) is supplied to the second graphics card 112 via the second connecting interface 12.

In step S9, the switch unit 23 is operated in the OFF-state so that the electric power from the power source (Vcc) is not supplied to the second graphics card 112.

Figure 5:
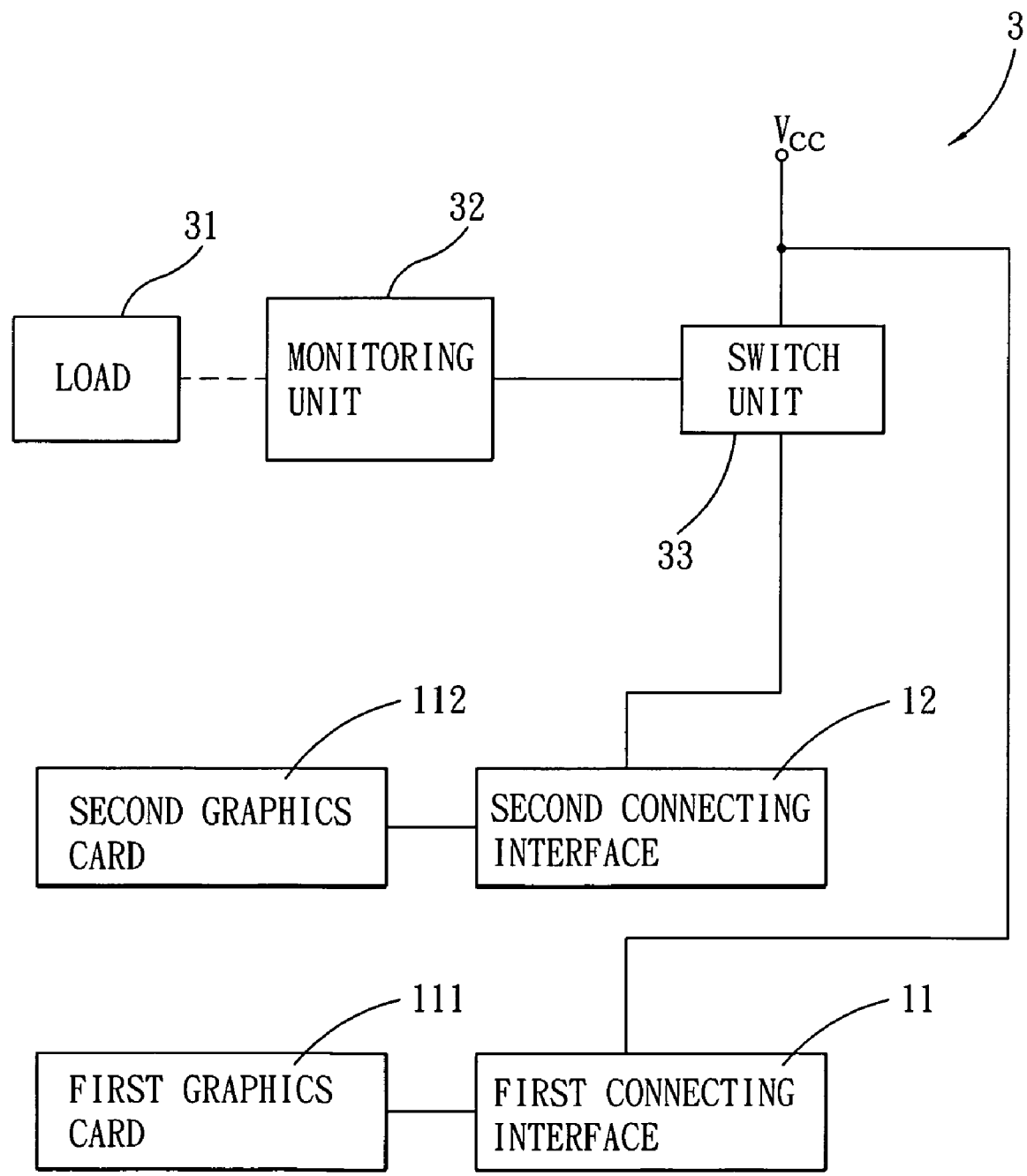
FIG. 5 is a schematic circuit block diagram illustrating the fourth preferred embodiment of a computing apparatus according to the present invention.

FIG. 5 illustrates the fourth preferred embodiment of a computing apparatus 3 according to this invention, which is a modification of the first preferred embodiment. In this embodiment, the computing apparatus 3' further includes a load 31, and a monitoring unit 32 coupled to the switch unit 33 for detecting the load 31 of the computing apparatus 3. The monitoring unit 32 controls the switch unit 33 to operate in the ON-state upon detecting that the load 31 of the computing apparatus 3 is not overloaded and to switch from the ON-state to the OFF-state upon detecting that the load 31 of the computing apparatus 3 is overloaded.

In sum, due to the presence of the switch unit 13, 23, 33, the computing apparatus 1, 2, 2', 3 of the present invention can control selectively and appropriately the electric power supplied to the second graphics card 112 via the second connecting interface 12, thereby effectively reducing power consumption of the computing apparatus 1, 2, 2' 3.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A computing apparatus comprising:
   first and second connecting interfaces;
   first and second graphics cards coupled respectively to said first and second connecting interfaces;
   a power source connected electrically to said first connecting interface for supplying electric power to said first graphics card via said first connecting interface;
   a switch unit coupled between said second connecting interface and said power source, and operable so as to switch between an ON-state, where said power source supplies electric power to said second graphics card via said second connecting interface, and an OFF-state, where the electric power from said power source is not supplied to said second graphics card;
   a control module coupled to said switch unit and operable so as to output a control signal to said switch unit so that said switch unit is switched to a selected one of the ON-state and the OFF-state based on the control signal from said control module; and
   a display unit coupled to said control module, and an input unit coupled to said control module, wherein said control module comprises:
   a BIOS memory for storing BIOS data and program code data;
   a system chipset coupled to said BIOS memory, said display unit, said input unit and said switch unit; and a central processor coupled to said system chipset;

wherein said central processor reads the BIOS data and the program code data from said BIOS memory for initialization upon power-on of said computing apparatus so that said system chipset is able to generate an output corresponding to the program code data, indicative of a currently set one of the ON-state and the OFF-state of said switch unit, and displayed on said display unit; and wherein said input unit is operable in accordance with the output displayed on said display unit to output an input signal corresponding to the selected one of the ON-state and the OFF-state of said switch unit to said system chipset so that said system chipset updates the program code data based on the input signal from said input unit and outputs the control signal to said switch unit based on the program code data.

2. The computing apparatus as claimed in claim 1, wherein each of said first and second connecting interfaces is a PCI-Express interface.

3. The computing apparatus as claimed in claim 1, wherein:
said switch unit includes a MOSFET that has a source coupled to said second connecting interface, a gate coupled to said control module, and a drain coupled to said power source;

when the control signal outputted from said control module is a first-level voltage, said switch unit is switched to the ON-state; and when the control signal outputted from said control module is a second-level voltage different from the first-level voltage, said switch unit is switched to the OFF-state.

4. The computing apparatus as claimed in claim 1, further comprising a load, and a monitoring unit coupled to said switch unit for detecting said load of said computing apparatus, said monitoring unit controlling said switch unit to operate in the ON-state upon detecting that said load of said computing apparatus is not overloaded and to switch from the ON-state to the OFF-state upon detecting that said load of said computing apparatus is overloaded.

5. The computing apparatus as claimed in claim 1, wherein said switch unit includes a manually operated mechanical switch.

6. A computing apparatus comprising:
first and second connecting interfaces;
first and second graphics cards coupled respectively to said first and second connecting interfaces;
a power source connected electrically to said first connecting interface for supplying electric power to said first graphics card via said first connecting interface;
a switch unit coupled between said second connecting interface and said power source, and operable so as to switch between an ON-state, where said power source supplies electric power to said second graphics card via said second connecting interface, and an OFF-state, where the electric power from said power source is not supplied to said second graphics card;
a monitoring unit coupled to said switch unit for detecting a load of said computing apparatus, said monitoring unit controlling said switch unit to operate in the ON-state upon detecting that said load of said computing apparatus is not overloaded and to switch from the ON-state to the OFF-state upon detecting that said load of said computing apparatus is overloaded.

7. A method for selectively controlling electric power supplied to one of two graphics cards, applied to a computing apparatus, the computing apparatus comprising first and second connecting interfaces for respectively coupling to first and second graphics cards, a power source connected electrically to said first connecting interface for supplying electric power to said first graphics card via said first connecting interface, a central processor, a system chipset connected to the central processor, a BIOS memory connected to the system chipset for storing BIOS data and program code data, an input unit and a display unit, the method comprising:

reading, by said central processor, the BIOS data and the program code data from said BIOS memory for initialization upon power-on of said computing apparatus so that said system chipset is able to generate an output corresponding to the program code data, indicative of a currently set one of an ON-state where said power source supplies electric power to said second graphics card via said second connecting interface and an OFF-state where the electric power from said power source is not supplied to said second graphics card;

displaying the output on the display unit; and determining if the currently set one of the ON-state and the OFF-state is to be changed in accordance with the output displayed on said display unit, if yes, outputting, by an input unit, an input signal corresponding to a selected one of the ON-state and the OFF-state to said system chipset so that said system chipset updates the program code data based on the input signal from said input unit and sets the selected one of the ON-state and the OFF-state based on the program code data.

8. A method for selectively controlling electric power supplied to one of two graphics cards, applied to a computing apparatus comprising a monitoring unit, first and second connecting interfaces for respectively coupling to first and second graphics cards, a power source connected electrically to said first connecting interface for supplying electric power to said first graphics card via said first connecting interface, the method comprising:

detecting, by the monitoring unit, a load of said computing apparatus;

if the monitoring unit detects that said load of said computing apparatus is not overloaded controlling, by the monitoring unit, the electric power to be supplied from said power source to said second graphics card via said second connecting interface; and if the monitoring unit detects that said load of said computing apparatus is overloaded, controlling, by the monitoring unit, the electric power not to be supplied from said power source to said second graphics card.

* * * * *